UNITED STATES PATENT OFFICE.

SAMUEL B. B. NOWLAN, OF NEW YORK, N. Y.

IMPROVED WATER-PROOF COMPOSITION.

Specification forming part of Letters Patent No. 57,956, dated September 11, 1866.

*To all whom it may concern:*

Be it known that I, SAMUEL B. B. NOWLAN, of the city, county, and State of New York, have invented a new and useful Improved Water-Proof Composition; and I do hereby declare that the following is a full, clear, and exact description thereof, which will enable others skilled in the art to make and use the same.

This invention relates to a new and improved water-proof varnish, which is to be applied to all kinds of textile fabric, paper, or other substances, for various purposes.

This composition is without taste or odor, and has no injurious effect on fabrics or other substances to which it may be applied, and is not liable to spontaneous combustion from chemical changes.

To prepare the fabric for the final treatment with the varnish it must be first saturated with a mixture of alum, common salt, and water, which are compounded in the following proportions in twenty-two parts, viz:

| | |
|---|---|
| Alum | 4 parts. |
| Salt | 2 parts. |
| Water | 16 parts. |
| Total | 22 parts. |

These ingredients are well mixed in an earthen or enameled vessel, at a temperature of 75° Fahrenheit, for two hours. The mixture may be colored by adding one part of any suitable color, such as ocher, and one part of glue may be added to give it more consistency.

The water-proof composition is then formed in thirteen parts of the following ingredients, and in the proportions marked to each:

| | |
|---|---|
| Paraffine of beech-tar | 3 parts. |
| Borax | 1 part. |
| Pure water | 8 parts. |
| Gum-tragacanth | 1 part. |
| | 13 |

Beech-tar is reduced in concentrated sulphuric acid, at a temperature of 150°, for twenty-four hours, for the purpose of obtaining the pure paraffine. The latter is then carefully cleaned by washing it in cold water, so that all traces of the acid are removed. The water, borax, and gum-tragacanth are then mixed at a temperature not exceeding 75° Fahrenheit, and stirred well occasionally during twenty-four hours, until the gum is completely amalgamated with the mixture. I then introduce the paraffine into the mixture of water, borax, and gum just described, and let the now finished composition stand for twelve hours at a temperature of 100° Fahrenheit.

For very fine and light-colored fabric I use gum-shellac instead of beech-tar, the shellac being treated with concentrated sulphuric acid in the same manner as the beech-tar.

The composition may be applied to the fabric on one or both sides, as may be required, and by any suitable mechanical means.

I claim and desire to secure by Letters Patent—

A water-proof composition made substantially in the manner herein described.

The above specification of my invention signed by me this 4th day of August, 1866.

SAMUEL B. B. NOWLAN.

Witnesses:
JAMES F. DWIGHT,
ALEX. F. ROBERTS.